No. 897,963.

PATENTED SEPT. 8, 1908.

D. E. & G. C. CLAYTON.
PUMP.
APPLICATION FILED NOV. 27, 1907.

3 SHEETS—SHEET 2.

Witnesses:
Jas. E. Hutchinson
J. W. Lake

Inventors
David E. Clayton
George C. Clayton
By Joel N. Morris Attorney

No. 897,963. PATENTED SEPT. 8, 1908.
D. E. & G. C. CLAYTON.
PUMP.
APPLICATION FILED NOV. 27, 1907.

3 SHEETS—SHEET 3.

Fig. 4.

Witnesses:
Jas. E. Hutchinson.
J. W. Lask.

Inventors:
David C. Clayton,
George O. Clayton,
By Joel R. Mims, Attorney.

UNITED STATES PATENT OFFICE.

DAVID E. CLAYTON AND GEORGE C. CLAYTON, OF NEWARK, NEW JERSEY.

PUMP.

No. 897,963.   Specification of Letters Patent.   Patented Sept. 8, 1908.

Application filed November 27, 1907. Serial No. 404,013.

*To all whom it may concern:*

Be it known that we, DAVID E. CLAYTON and GEORGE C. CLAYTON, citizens of the United States, residing at Newark, in the county of Essex and State of New Jersey, have invented certain new and useful Improvements in Pumps; and we do declare the following to be a full, clear, and exact description of the invention, such as will enable others skilled in the art to which it appertains to make and use the same.

This invention provides improvements in pumps, and relates particularly to those wherein a continuous flow of fluid is produced, the object being to provide an efficient multiple-cylinder pump wherein are embodied certain novel features of construction tending to efficiency, reliability, and simplicity, as will appear from the description hereinafter.

For purposes of illustration, an embodiment of the invention is shown as applied to an air-pump, and particularly those used in inflating vehicle-tires.

When read in connection with the description herein, the details of construction and arrangement of parts contemplated by this invention will be apparent from the accompanying drawings, forming part hereof.

Like reference-characters refer to corresponding parts in the several views of the drawings, of which—

Figure 1:
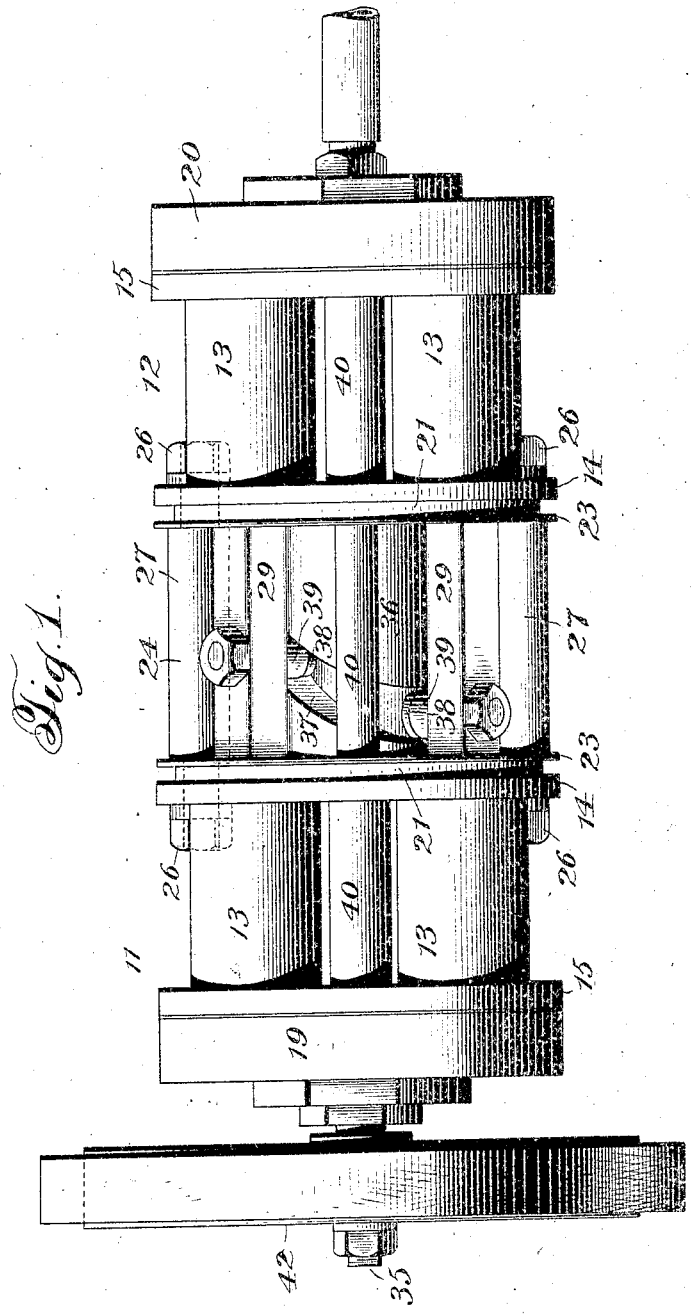
Figure 2:
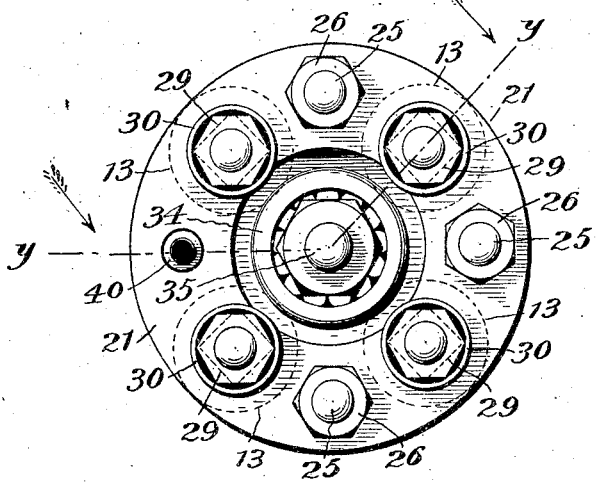
Figure 3:
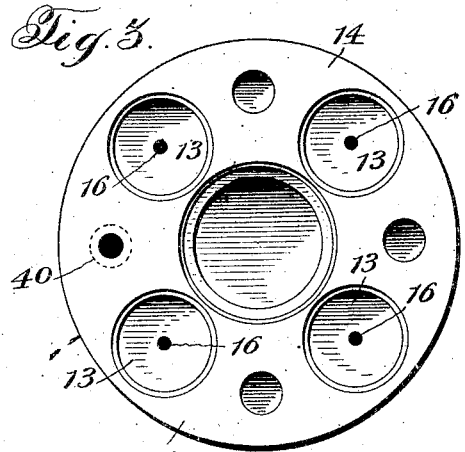
Figure 5:
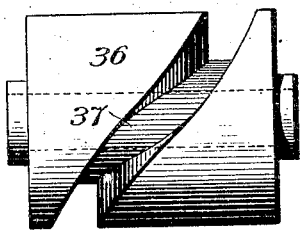

Figure 1 is a side view; Fig. 2 is an end view of one of the pump-casing members; Fig. 3 is an end view with one of the casing members removed; Fig. 4 is a longitudinal sectional view on the line $y$—$y$, Fig. 2; and Fig. 5 is a view of the drive-shaft.

Referring more particularly to the drawings, 11 and 12 designate oppositely-disposed members formed with pump-casings or cylinders 13 circumferentially arranged between circular disk portions 14 and 15, there being an equal number of casings or cylinders in each member, and the casings or cylinders of one member being alined with those of the other. The outer ends of these casings open through valved ports 16 in disk portions 15 into compression-chambers 17 and 18 formed on the outer ends of members 11 and 12 by hollow casings 19 and 20, respectively, these casings being open on the sides adjacent to disk portions 15 of the members and screwed or otherwise secured thereto to form a fluid-tight joint therewith and to constitute therewith a closed chamber.

Disposed against each of disk portions 14 is a plate 21 of sufficient diameter to cover the ends of casings 13 with the exception of a portion at each casing end to form intake-openings 22. This plate is formed with a circumferential flange 23 overhanging, but not closing, the intake-openings, in order to afford protection therefor. Members 11 and 12 and plates 21 are connected and held a proper distance apart by bolts 24, the ends 25 of which are reduced and screw threaded and engaged by nuts 26. Bolt-ends 25 pass through disk portions 14 and plates 21, and the nuts are arranged to clamp these portions and plates together and the plates against the ends of the enlarged central portions 27 of the bolts, whereby the members are held in proper separated relation. Through angular bearings 28 in plates 21 are operable piston-rods 29, which are correspondingly angular in cross-section to prevent turning. A piston-rod 29 extends into and is reciprocable in each pair of alined casings 13, and a piston 30 is carried on each end of the rod.

A barrel portion 31 extends through casing 19 and disk-portion 15 of member 11. Disk portions 14 are centrally apertured, as are also plates 21, the apertures of the disk-portions being designated by 32. Located in each aperture 32, and held therein against endward outward longitudinal movement by a circumferential flange 33 in each, is a bearing 34. Passing through barrel 31, and journaled in bearings 34, is a drive-shaft 35, located on which and between the bearings is an enlarged portion 36, having formed on its periphery a cam-groove 37. Projecting inwardly from each piston-rod 29 is a pin 38, having thereon a roller 39 arranged to traverse groove 37, the bearing-surfaces of which groove operate to reciprocate the piston-rod.

Upon rotation of the shaft the pump is operated by reciprocation of the pistons in an obvious manner. Fluid is forced from the pump-casings through ports 16 into chambers 17 and 18, that compressed into chamber 17 is carried by a by-pass 40 to chamber 18, and the current of fluid produced by operation of the pump passes out through outlet 41, which latter may be fitted with a nipple or other form of connection with any suitable conducting means. The configuration of the cam-groove is such that at least one of the pistons is being operated in a direction to force fluid into one or the other of the chambers at all times of rotation of the shaft, a constant force of compression being thereby maintained.

Rotation may be imparted to the drive-shaft in any suitable manner. In the drawings a drive-wheel 42 is shown on the end of the shaft, this wheel being of the character that may be engaged with the fly-wheel of a motor-vehicle for the purpose of operating the pump to inflate wheel-tires, the pump being movably mounted in any suitable manner adjacent to the fly-wheel so that it may be readily engaged and disengaged therefrom.

Having thus described our invention, what we claim as new, and desire to secure by Letters Patent, is—

1. A pump comprising oppositely-disposed pump-casing members, each member comprising flat portions and a plurality of pump-casings disposed therebetween, the casings of one member being alined with those of the other, a drive-shaft journaled in said members and having thereon a cam surface, a piston-rod operable in each pair of alined casings, means on said rods and operable on said cam surface whereby said rods are reciprocated, an outer casing connected with each casing member and forming therewith a compression-chamber with which said pump-casings of the member communicate, and a by-pass connecting the compression-chambers.

2. A pump comprising oppositely-disposed members each having a pump-casing therein disposed opposite to that in the other, means whereby said members are maintained in separated fixed relation, an outer casing on each member in communication with its pump-casing and forming a compression-chamber, means of communication between the compression-chambers, a drive-shaft journaled in said members and having between the members a cam surface, a piston-rod operable in the oppositely positioned pump-casings, and means on said piston-rod operable on said cam surface whereby said rod is reciprocated.

DAVID E. CLAYTON.
GEORGE C. CLAYTON.

Witnesses:
GEORGE PRITCHARD,
WILLIAM H. ADAMS.